United States Patent [19]
Riousset et al.

[11] Patent Number: 5,337,165
[45] Date of Patent: Aug. 9, 1994

[54] ARCHITECTURE FOR A TELEPHONE FACSIMILE TERMINAL

[75] Inventors: Denis Riousset, Epinay sur Seine; Jean-Louis Richiero, Stains, both of France

[73] Assignee: Alcatel Business Systems, Paris, France

[21] Appl. No.: 828,183

[22] Filed: Jan. 30, 1992

[30] Foreign Application Priority Data

Jan. 31, 1991 [FR] France ............... 91 01077

[51] Int. Cl.$^5$ .................... H04N 1/23; H04N 1/04
[52] U.S. Cl. .................... 358/496; 358/498; 358/296; 358/401
[58] Field of Search ............ 358/496, 498, 494, 476, 358/468, 442, 443, 296, 304, 401, 503; 346/76 PH, 136; D14/118

[56] References Cited

U.S. PATENT DOCUMENTS

| | | | |
|---|---|---|---|
| 4,630,123 | 12/1986 | Kadomatsu | 358/498 |
| 4,833,547 | 5/1989 | Mase | 358/296 |
| 5,138,463 | 8/1992 | Morimoto et al. | 358/498 |

FOREIGN PATENT DOCUMENTS

| | | |
|---|---|---|
| 0188865 | 7/1986 | European Pat. Off. . |
| 0299437 | 1/1989 | European Pat. Off. . |
| 2169467 | 7/1986 | United Kingdom . |

*Primary Examiner*—Edward L. Coles, Sr.
*Assistant Examiner*—Scott A. Rogers
*Attorney, Agent, or Firm*—Sughrue, Mion, Zinn, Macpeak & Seas

[57] ABSTRACT

The terminal housing firstly includes a base (1) which contains circuits corresponding respectively to a telephone circuit (4) and to a power supply (5), a roll (8) of continuous print medium (9), one or more motors (6) actuating both a medium-cutting device and drive rollers (10, 11) for a document to be faxed and for the continuous print medium, and secondly includes a hinged cover (2) which contains at least a man-machine communication arrangement (16, 17), a monitoring logic circuit (13), a scanning head (14), and a print head (15), and which is hinged at one end on the base so that it is alternately either closed on the base so as to close the housing and to position the heads relative to their associated rollers, or open so as to give access to the essential components both inside the base and inside the cover.

1 Claim, 4 Drawing Sheets

ARCHITECTURE FOR A TELEPHONE FACSIMILE TERMINAL

BACKGROUND OF THE INVENTION

The present invention relates to architecture for a telephone facsimile terminal, in particular for a facsimile terminal which is optionally also a photocopier, or for a telephone incorporating a facsimile terminal.

As with other apparatuses that are in increasingly common use, such terminals are tending to become more compact so as to facilitate their installation, and to become simpler to operate and to maintain. Both of these factors improve user-friendliness and consequently provide greater satisfaction for users.

Insofar as the purpose of facsimile is to enable a graphic document to be reproduced remotely in the form of another graphic document which is geometrically similar to the original, facsimile terminals are relatively bulky. Their size is at least partially a function of the generally non-negligible dimensions of the documents to be reproduced.

Their bulkiness is often a drawback for the user since the premises in which facsimile terminals are installed are conventionally general-purpose premises, such as offices and/or living accommodation, in which there is little available space, and in which users only wish to give over the smallest possible amount of space both for installing and for operating their various auxiliary apparatuses.

Similarly, users wish to reduce visits from specialized maintenance personnel to the absolute essential so as to minimize the resulting time loss in operating the apparatuses and in using the premises.

This has led to existing apparatuses being reexamined so as to attempt to reorganize them so that they are made more efficient and more reliable, in particular by simplifying them.

SUMMARY OF THE INVENTION

The invention therefore provides architecture for a telephone facsimile terminal, in particular for a telephone set incorporating a facsimile terminal which is optionally also a photocopier, or for a basic facsimile terminal, the architecture both reducing size, and also simplifying operation and in particular general maintenance.

Usually, the architecture includes a housing constituted by separable body elements which contain at least the following essential components:

a scanning head associated with an adjoining "scanning" roller provided to drive a document to be faxed in front of the head, which document is inserted between said head and said roller via an access opening provided in the housing, and under the action of a drive device situated in the proximity of the access opening;

a print head associated with an adjoining "print" roller provided to drive a continuous print medium in front of the print head and towards an output opening in the housing, which medium has one end initially inserted between the print roller and the print head, and is stored in the form of a roll inside the housing;

at least one electric motor for actuating the rollers and optionally a medium-cutting device which is situated in the path of the medium inside the housing between the output opening and the assembly formed by the print head and the print roller;

a man-machine communication arrangement enabling a user to control the telephone facsimile terminal locally, and providing local signalling by optical and/or acoustic means; and a circuit assembly comprising at least a telephone circuit, a monitoring logic circuit for monitoring the terminal, and a power supply.

According to a characteristic of the invention, the housing firstly includes a base which contains the roll of print medium, the circuits corresponding respectively to the telephone circuit and to the power supply, and the motor(s) together with the rollers and optionally the cutting device that are actuated by the motors, and secondly includes a hinged cover which contains at least the man-machine communication arrangement, the associated monitoring logic circuit, and the heads, and which is hinged at one end on a corresponding end of the base so that it is alternately either closed on the base so as to close the housing and to position the heads relative to their associated rollers, or open so as to give access to the essential components both inside the base and inside the cover.

The invention, its characteristics, and its advantages are specified in the following description given with reference to the figures listed below.

DESCRIPTION OF THE PREFERRED EMBODIMENTS

Figure 1:
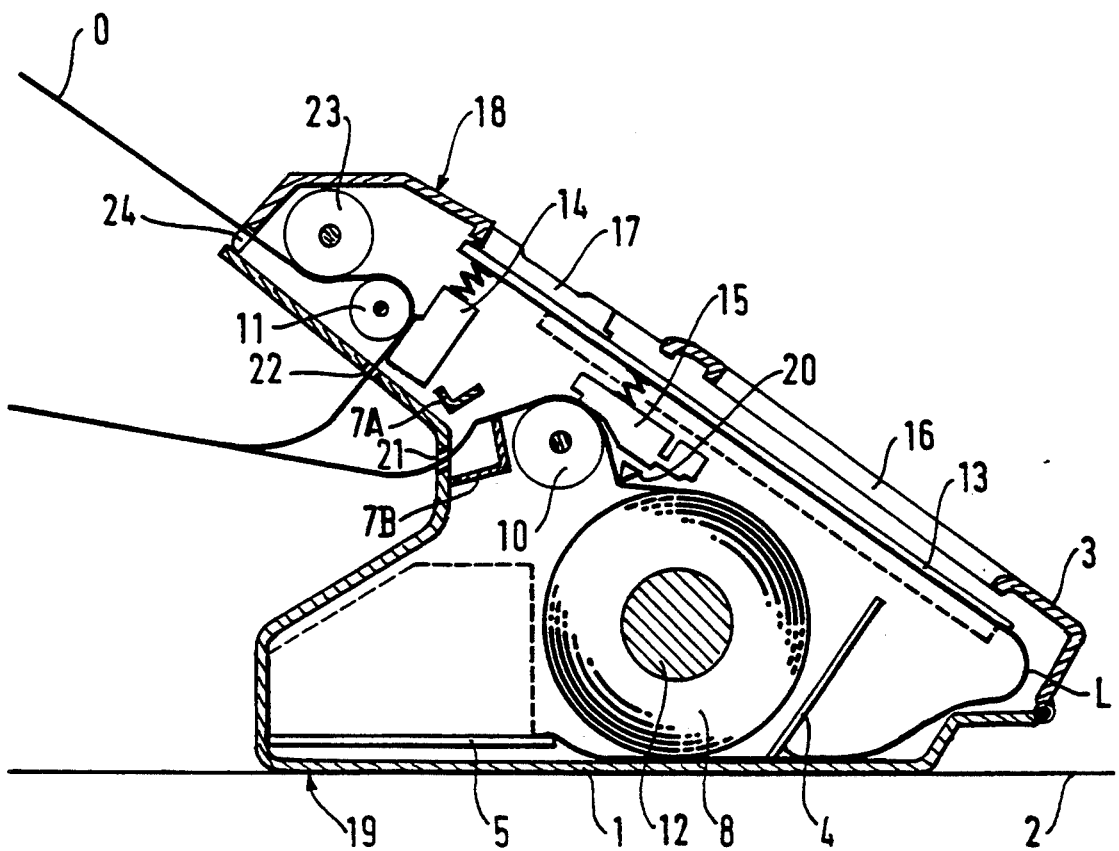
FIGS. 1 and 2 each show the same side section through a telephone facsimile terminal of the invention shown closed in one figure and open in the other.
Figure 2:
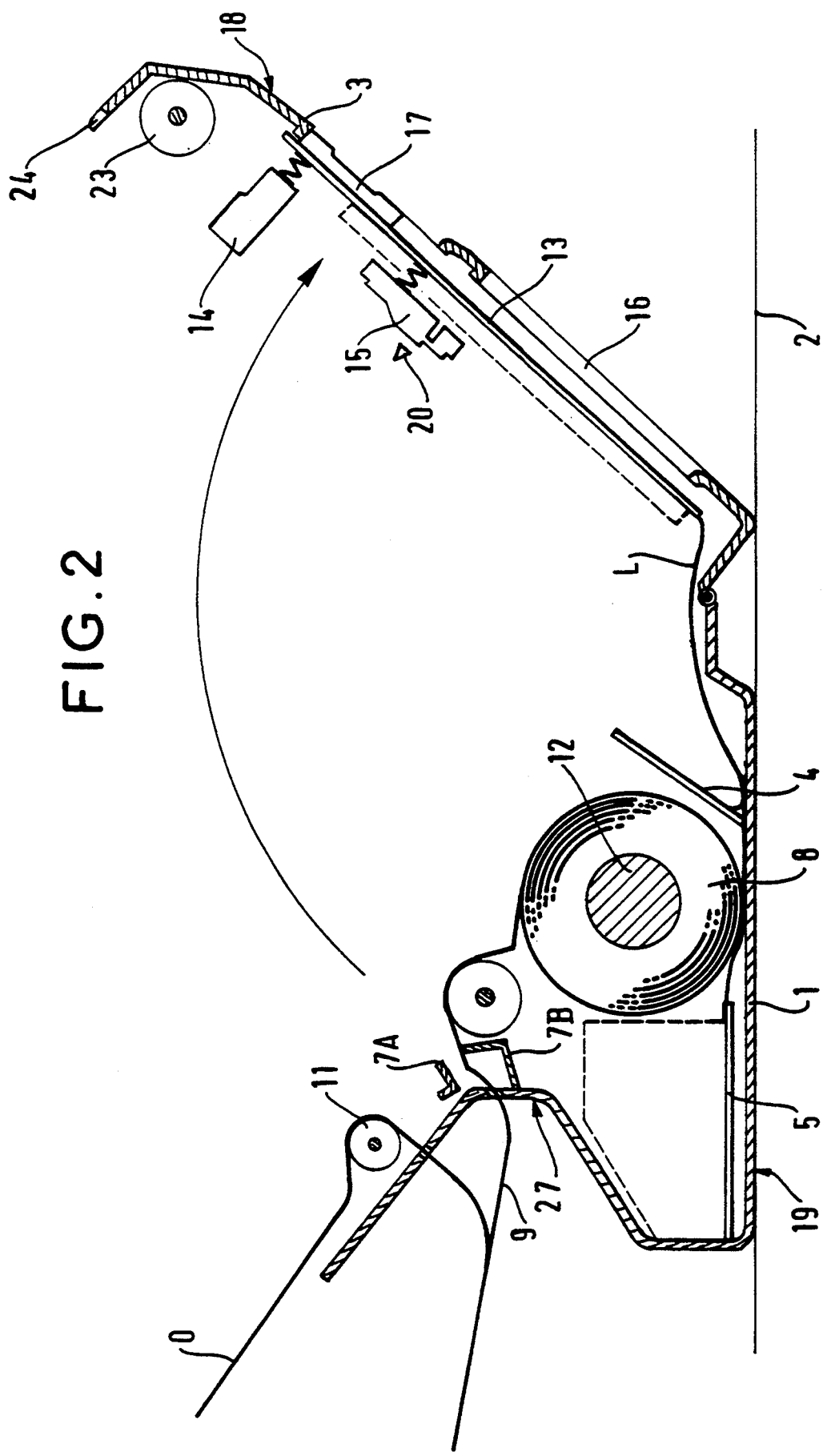
Figure 3:
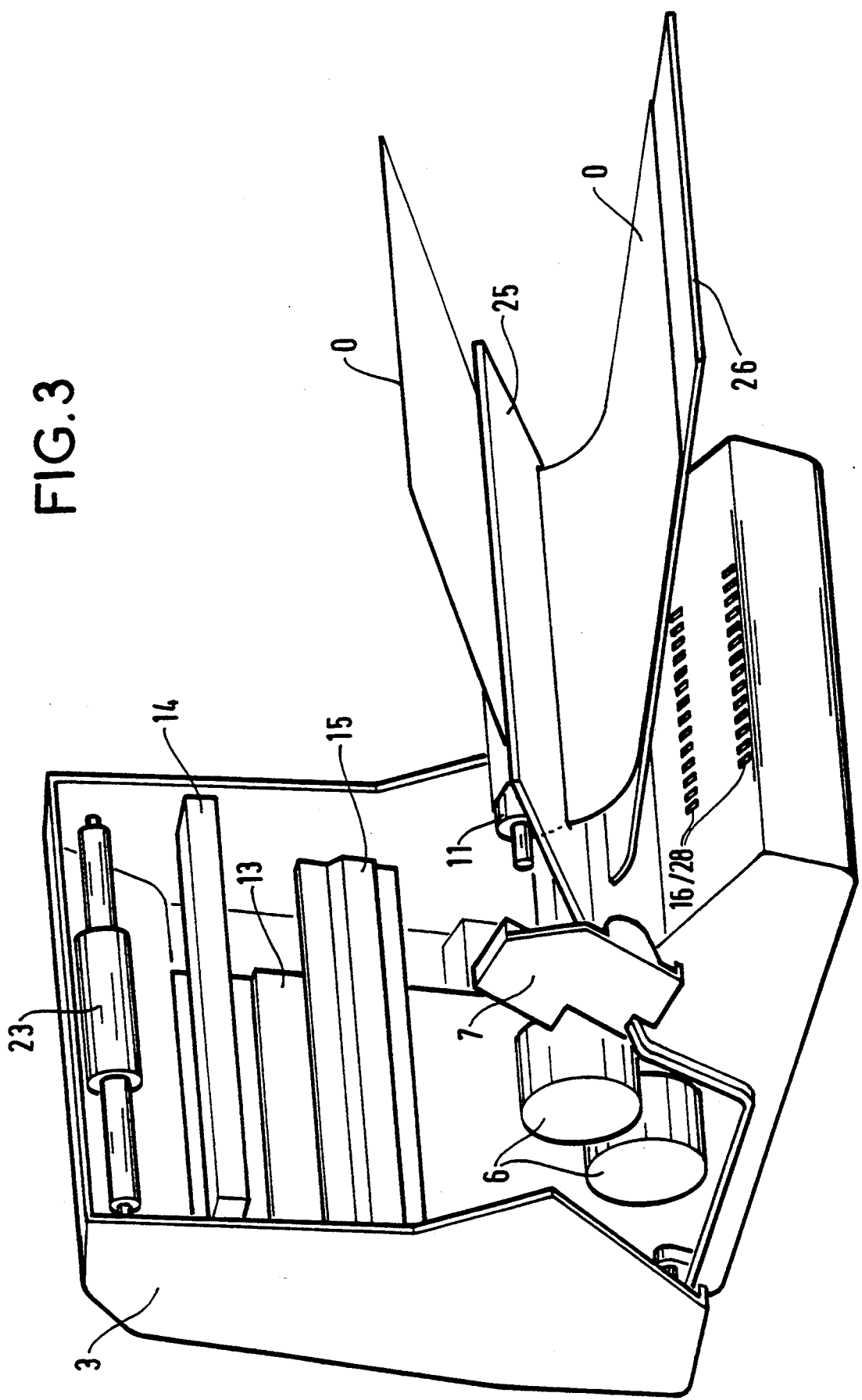
FIG. 3 is a simplified perspective view of the telephone facsimile terminal of the invention in the open position.
Figure 4:
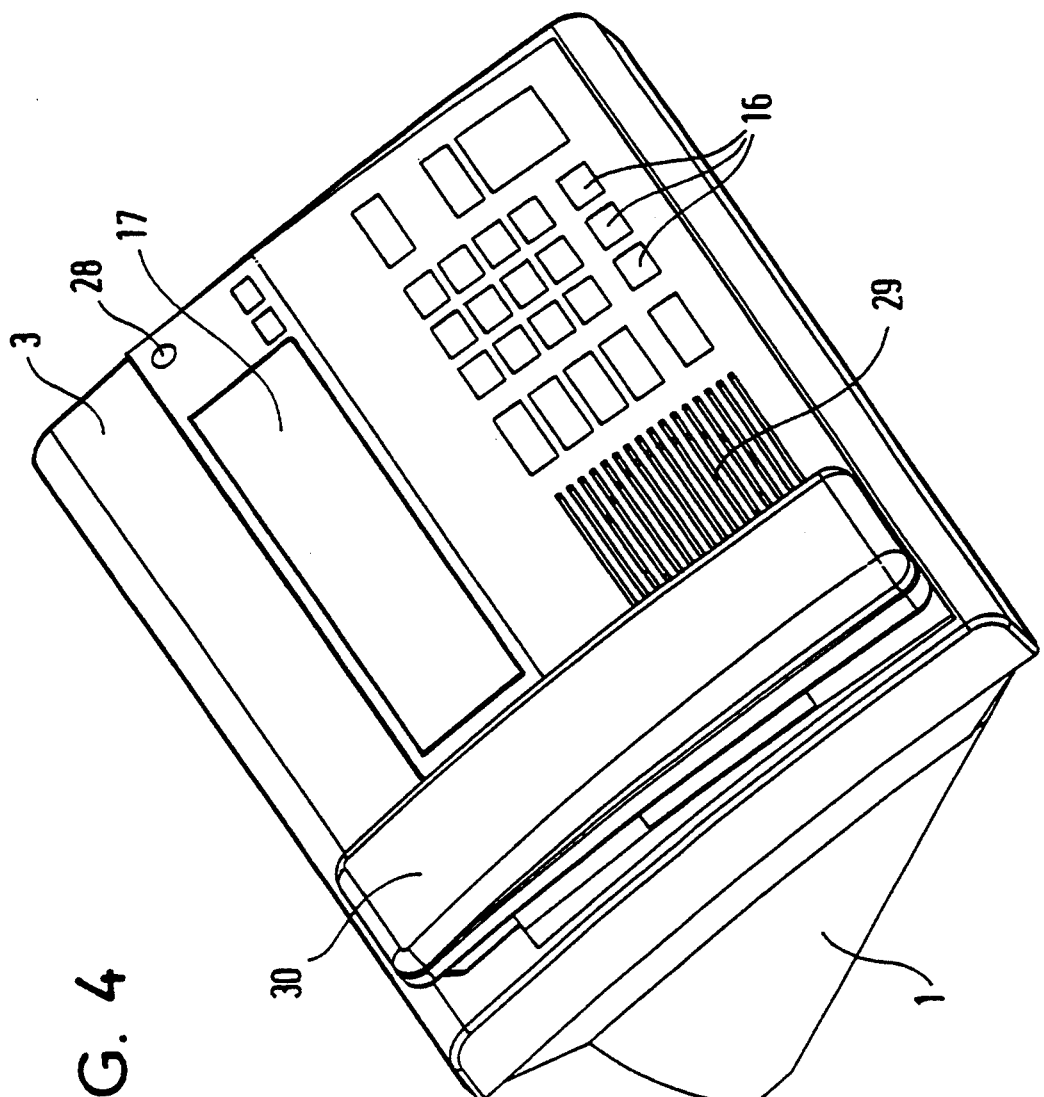
FIG. 4 is a perspective view of a variant terminal, of the type which is a subscriber telephone set integrating a facsimile terminal.

The telephone facsimile terminal shown in FIGS. 1 to 3 and the one shown in FIG. 4 are each conventionally constituted of separable body elements which form a housing when they are assembled and which are designed to contain the majority, if not all, of the components that each terminal includes.

In the proposed embodiments, the housing of the terminal includes a box-shaped base 1 which is open at its top and which is designed to be stood on its bottom on a plane support 2 that is preferably horizontal, such as a table top or a desk top.

A hinged cover 3 (whose inside surface is recessed in this case) is hinged on one end of the base 1 so as to enable the housing to be alternately either closed by covering the open top of the base with the cover, or opened by opening the cover, thereby giving access to the various components of the telephone facsimile terminal that are accessible both inside the base and inside the cover.

In the proposed embodiment, the base 1 contains electrical and/or electronic circuits which are essentially an electric power supply 5, and a telephone circuit 4 enabling faxes to be transmitted and received over a telephone channel. In general, the telephone circuit 4 is carried by a printed circuit card as shown in FIGS. 1 and 2. Its construction is considered to be conventional and is not described here because it is not directly related to the invention.

The electric power supply 5 is conventionally connected to a power source which, in general, is an AC source, is outside the terminal, and is a public mains network. In a manner known per se, the electric power supply provides the voltage conversion and matching required for powering the circuits and components of the terminal that are not powered via the telephone line (not shown) to which the terminal connected for interchange with other telephone terminals.

One or more drive motors 6 (FIG. 3) and an actuator 7 for actuating a cutting device (considered here to be equipped with two blades 7A and 7B) are also dependent on the power supply 5 for their power requirements. They are housed in the base 1 and fixed thereto.

The base 1 also contains a roll 8 of continuous print medium 9 enabling the user to dispose of a long length of medium (which may be cut as required) for printing documents that are transmitted to the terminal by facsimile over the telephone line.

In the proposed embodiment, the continuous print medium 9 is of the heat-sensitive paper type for thermal printing, and for example, its width corresponds to the width of a conventional mail-type document sheet, e.g. corresponding to the width of standard A4-format documents, such as the sheet O.

A "print" drive roller 10 and a "scanning" drive roller 11 are also disposed in the base 1, parallel to the shaft 12 of the roll 8. The length of each drive roller is a function of the maximum width permitted by the telephone facsimile terminal both for documents to be faxed and for documents to be printed.

The drive rollers 10 and 11 are rotated by the motor(s) 6 as a function of the instructions given to the motor by a monitoring logic circuit 13 following either a local or a remote fax instruction.

In known manner, the telephone facsimile terminal also includes a scanning head 14 for scanning documents to be faxed, a print head 15 for printing documents transmitted by facsimile onto the medium, and a man-machine communication arrangement.

The communication arrangement may vary in its construction as a function of the type of terminal considered, as illustrated by the differences between FIG. 3 which shows a basic facsimile terminal and FIG. 4 which shows a telephone incorporating a facsimile terminal. In particular, the communication arrangement is composed of manual control members so that the terminal can be locally controlled by the user, e.g. keypad keys 16, and local signalling members, e.g. indicator lights 28 optionally incorporated into the keypad keys 16, a display screen 17, and a sound-signalling loudspeaker 29 in the case of a basic facsimile terminal which is optionally also a photocopier. If it is also designed to provide the voice call functions of a telephone, the communication arrangement further includes a telephone handset 30 and/or a microphone associated with a loudspeaker for "hands-free" type telephone use.

In this embodiment, the heads 14 and 15, and the man-machine communication arrangement are secured to the cover 2 inside which at least part of the monitoring logic circuit 13 is housed, which monitoring logic circuit is conventionally implemented on a printed circuit card, as shown in the figures, and the heads are usually resiliently mounted.

In the proposed embodiment, the manual control members and the local signalling members, in particular the keypad keys 16 and the display screen, are disposed on a facade of the housing that is constituted by an outside face 18 of the cover 2, which face is disposed on the top of the housing when the closed housing is placed on its bottom on a horizontal support 2.

Furthermore, in this embodiment, the outside face 18 slopes down towards the front of the base relative to the plane of abutment 19 of the bottom of the base on the support 2, and consequently down towards the user, with the front of the base and consequently of the housing corresponding to the region in which the cover 2 is hinged on the base 1.

In this embodiment, the slope of the facade relative to the plane of abutment is about thirty degrees so as to facilitate operating the keys and viewing the data supplied both by any indicator lights and by the display screen 17, in particular if the screen is of the liquid crystal display type.

In the proposed embodiment, the circuit card on which at least part of the monitoring logic circuit 13 of the telephone facsimile terminal is implemented is disposed inside the cover 2 facing and virtually against the manual control members and the local signalling members so that they are connected directly to the conductive tracks (not shown) carried by the card to link the members to the logic circuit.

The conductive tracks are also connected directly or via intermediate links (not shown) both to the scanning head 14 and to the print head 15 so as to enable signal interchange between the heads and both the monitoring logic circuit and the telephone circuit 4. The conductive tracks also supply electric power from the power supply 5 to the various consumer components which are fixed to the cover.

To this end, flexible connection links L, e.g. contained in a flat multiconductor cable, run between the base 1 and the cover 2 in the common hinge region thereof and interconnect the cards, such as 4 and 5, that are fixed to the base with the preferably sole card that is fixed to the cover 2, i.e., in this embodiment, the card carrying the monitoring logic circuit 13.

Opening the cover 2 provides access to the various above-mentioned components both inside the base 1 and inside the cover 2.

Closing the cover 2 on the base 1 closes the top opening therein, through which opening it is otherwise possible to access the components contained by the base.

Closing the cover 2 on the base positions the scanning head 14 and the print head 15 relative to the drive rollers 11 and 10 with which they are to be respectively associated to enable normal operation of the telephone facsimile terminal.

In conventional manner, the scanning head and the print head are both of the strip type as shown in FIG. 3. Each head has a length corresponding to the maximum width permitted by the telephone facsimile terminal both for documents to be faxed and for documents to be printed, in the same way as the rollers with which the heads co-operate.

Each head 14 or 15 is placed so as to adjoin one of the drive rollers 11 or 10 to which its active portion is parallel and almost tangential.

One end of the medium 9 initially situated at the periphery of the roll 8 is to be initially inserted into the adjoining region between the roller 10 and the print head 15, conventionally after having been flattened out by a flattening unit having a deflector blade 20, considered in this embodiment to be fixed to the cover 2 on which it resiliently mounted.

Such a flattening unit is described in particular in Patent No. EP-A-0374827. There is a tendency for a portion of the medium paid out from the roll to roll up, and the flattening unit enables this tendency to be countered.

The roller 10 drives a portion of the paid-out medium by friction so that it passes gradually in front of the "active" portion of the print head so as to receive therefrom the graphics corresponding to the graphics of the initial faxed document being received by the terminal over the telephone line to which the terminal is connected.

In the embodiment in question, printing is considered to be conventionally performed by transferring heat from the print head 15 to the continuous print medium 9 onto which documents are successively faxed by scanning in a dimension which is considered to be length, the print head 15 simultaneously printing a document region taken widthwise.

The cutting device is conventionally placed along the medium path which extends inside the housing between an output opening 21 through which the medium leaves the housing and the print assembly formed by the roller 10 and the head 15.

For example, the cutting device includes two shear blades 7A, 7B which are actuated by a side actuator 7 and which are of lengths corresponding to the maximum width provided for faxed documents, and consequently to the width of the medium 9. The blades are disposed one on either side of the path provided for the medium to advance towards the output opening 21 and are provided so as to be actuated under the control of the monitoring logic circuit 13, after the head 20 has printed one page of document onto the medium 9, so as to cut off each printed page.

In the proposed embodiment, the output opening is constituted by a slot provided in the rear face of the base 1 and extending longitudinally on an axis parallel to the plane of abutment 19 of the base on a support.

In this embodiment, the output opening 21 for the medium 9 is provided in a recess 27 in the wall, which recess is designed so as to minimize the length of the internal path of the medium between the output and the region in which the medium leaves the roller after printing at the adjoining region between the print roller and the print head 15.

In this embodiment, a second opening 22 is provided above the opening 21 and in the recess 27 situated at the rear of the base 1. The longitudinal axes of the two approximately same-sized openings are parallel firstly to each other and to the axes of the rollers 10 and 11, and secondly to the plane of abutment 19 of the base 1.

The opening 22 is designed to enable output of documents to be faxed for remote transmission, and it is situated downstream of the assembly formed by the scanning roller 11 and the scanning head 14 between which each sheet O of document to be faxed is inserted, under the combined action of the roller 11 and of a roller 23 of a device situated at an access opening 24 for a document to be faxed.

For example, the roller 23 is one of the component parts of an unstacker also including a rubber (not shown). An example of an unstacker is described in particular in Patent No. EP-A-0374826.

In a known manner, such an unstacker enables the various document sheets stacked on a supporting tray, such as 25 in FIG. 3, to be separated by one of the sheets being driven by the roller 23 while the following sheet and consequently the other sheets are retained by the action of the rubber.

The access opening 24 opens out to the outside of the housing of the termimal on the top of the tray 23 and above the output opening 22 via which the document sheets previously inserted via the access opening for faxing are expelled. Preferably, the access opening has its longitudinal axis parallel to the corresponding axes of the other openings 21 and 22.

In the embodiment given, the roller of the drive device 23 is housed inside the cover 2, it is fixed thereto, and it is placed at the "moving" end thereof, which moving end is opposite from the end via which the cover 2 is hinged on the base 1. The rubber (not shown) which is generally tangential to the roller 23 in the unstacker is preferably mounted in and fixed to the base, thereby enabling the roller to be separated from the rubber by simply opening the cover 2 when necessary, in particular in the event that document sheets to be faxed jam inside the housing.

For the same reasons, opening the cover 2, thereby also enabling the heads 14, 15 to be separated from their associated rollers 11, 10, consequently facilitates clearing jams at these components, if need be.

In one embodiment, the access opening 24 is provided in the rear face of the housing where the base 1 meets the cover 2, and the length of the path of the document to be faxed between the access input 24 and the scanning assembly formed by the roller 11 and by the head 14, via the unstacker having the roller 23, is minimized by the scanning assembly being positioned in the proximity of the opening 24 at the moving end of the cover.

The same goes for the path of the document between the above-mentioned scanning assembly and the document output opening 22, because of the recess provided in the rear of the base to minimize the distance between the scanning assembly and the wall of the base at the output opening, and consequently the corresponding length of the path inside the housing.

The scanning head which may be of the usual type conventionally includes means enabling a region of the document to be faxed to be illuminated, and means for scanning and digitally encoding the graphics present in said region which extends over the width of the document to be faxed in the example chosen, the document being successively scanned over its length.

In the proposed embodiment, a single supporting tray 26 is provided under the output openings 21 and 22, and consequently under the supporting tray 25, which single supporting tray 26 is used both for the documents coming from the scanning assembly via the opening 22, and for the sheets obtained by cutting the medium and output via the opening 21, since the corresponding expulsions are not generally simultaneous, except if the terminal is also used as a photocopier.

What is claimed is:

1. Architecture for a telephone facsimile terminal, comprising a housing with three parallel rear openings which correspond respectively to an access first opening enabling insertion of a document to be faxed, to an output second opening enabling expulsion of a document previously inserted via said access opening, and to an output third opening for a print medium, said housing containing a base which contains a roll of print medium, circuits corresponding respectively to a telephone circuit and to a power supply, motors,, a print medium cutting device, and driving rollers for the print medium and document, said housing also containing a hinged cover which contains a man-machine communication arrangement, an associated monitoring circuit, and printing and scanning heads, said hinged cover at least partially sloping down toward a front of the housing relative to a plane of abutment of the base on a support, wherein said access first opening is disposed where said base meets said cover at an end thereof which is opposite from one end via which said cover is hinged on said base near said front of said housing, wherein said output second opening for document expulsion is disposed in a rear wall of said base in proximity to an assembly formed by a scanning roller and said scanning head next to said access first opening so as to minimize the length of a document path inside said housing between said access and output second opening, and wherein said print medium output third opening opens in a recess of said rear wall of said base in proximity to an assembly including said printing head, a printing roller and said cutting device, so as to minimize the length of the medium path towards said medium output third opening, and next to said output second opening for document expulsion, so as to allow use of a same supporting tray for a document and for a page printed on said medium.

* * * * *